United States Patent Office 3,537,814
Patented Nov. 3, 1970

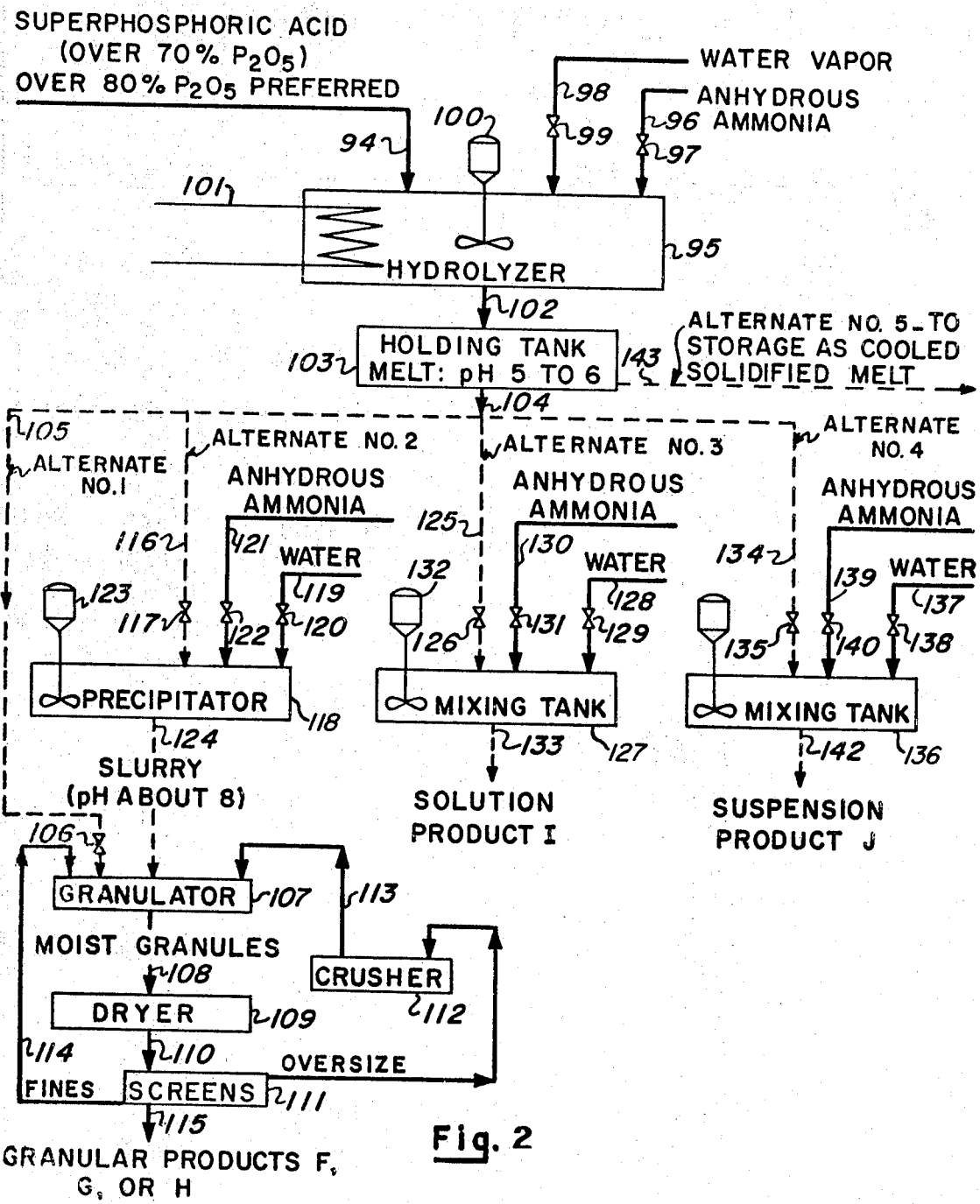

3,537,814
AMMONIUM POLYPHOSPHATE PRODUCED AT
ATMOSPHERIC PRESSURE
Thad D. Farr, Sheffield, and Henry K. Walters, Jr.,
Florence, Ala., assignors to Tennessee Valley Authority,
a corporation
Original application Aug. 24, 1967, Ser. No. 663,171, now
Patent No. 3,484,192, dated Dec. 16, 1969. Divided
and this application Oct. 2, 1968, Ser. No. 765,746
Int. Cl. C01b 25/28, 25/38
U.S. Cl. 23—107                                      5 Claims

ABSTRACT OF THE DISCLOSURE

A process for the preparation of ammonium polyphosphate by the ammoniation of polyphosphoric acids containing preferably more than 80 percent $P_2O_5$ with concurrent hydrolysis of the objectionable long-chain phosphate species. An intermediate melt pH 5 to 6 is prepared and processed further to produce granular solids, solutions, or suspensions that contain ammonium pyrophosphate as the major phase.

Figure 1:
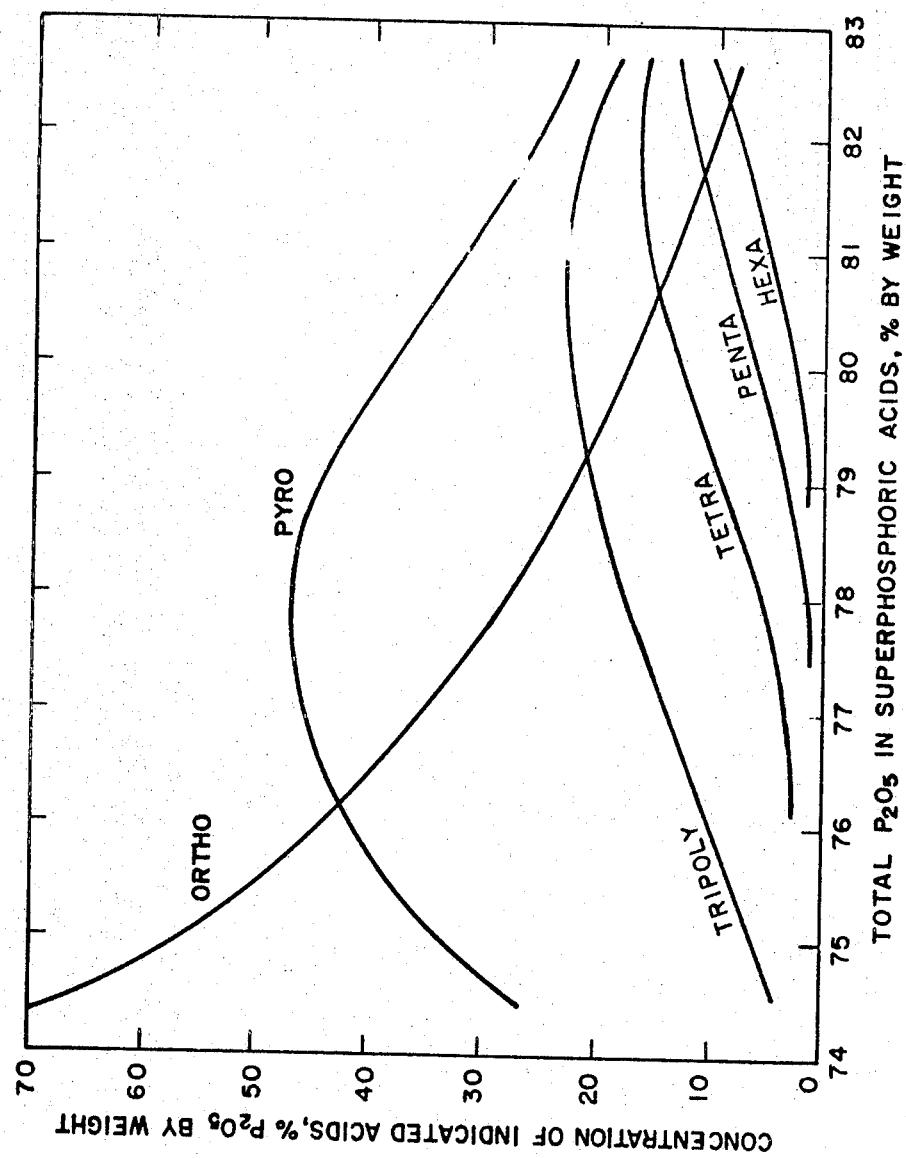

The invention herein described may be manufactured and used by or for the Government for governmental purposes without the payment to us of any royalty therefore.

This application is a division of application Ser. No. 663,171, filed Aug. 24, 1967, now Pat. No. 3,484,192, Dec. 16, 1969.

Our invention relates to an improved process for the production of high-analysis ammonium polyphosphate salts and solutions and more particularly to the preparation of ammonium acyclic polyphosphate salts and solutions by the ammoniation of superphosphoric acid at atmospheric pressure.

The term "superphosphoric acid" used in the specification and claims is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), page 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus, 97.85 to 2.32 percent ortho-
2.15 to 49.30 percent pyro-
0.00 to 24.98 percent tripoly-
0.00 to 16.99 percent tetrapoly-
0.00 to 12.64 percent pentapoly-
0.00 to 9.75 percent hexapoly-
0.00 to 8.63 percent heptapoly-
0.00 to 7.85 percent octapoly-
0.00 to 6.03 percent nonapoly-
0.00 to 29.41 percent higher polymers.

Acids of the above type are available from commerical sources of electric-furnace superphosphoric acid plants and may be produced with $P_2O_5$ contents ranging from about 74 to about 83 percent by a process described in U.S. Pat. 3,015,540, Striplin.

Our invention is especially valuable in the production of solid and liquid ammonium polyphosphates by the atmospheric ammoniation of superphosphoric acid of any practical $P_2O_5$ content higher than about 70 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Pat. 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Pats. 3,171,733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relativey low degree of ammoniation as compared to 9.6 pounds $NH_3$ per unit $P_2O_5$ in diammonium orthophosphate or in tetraammonium pyrophosphate. Another disadvantage is that it will cake in storage unless conditioned; the caking characteristics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Pats. 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P-N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content on the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide a process wherein superphosphoric acids containing more than about 70 percent $P_2O_5$ are ammoniated and may be hydrolyzed under specified conditions to prepare substantially anhydrous melts or solidified products at pH about 6 with pyrophosphate contents significantly higher than that in the starting acid, which are then processed further under specified conditions to produce granular solids, concentrated aqueous solutions, or suspensions, which have relatively high ratios of N to $P_2O_5$, which contain pyrophosphate as the major phase and ortho- and tripolyphosphates as minor phases, and which have good handling and storage properties.

Another object of the present invention is to provide a process wherein superphosphoric acid containing more than about 70 percent $P_2O_5$ is ammoniated and may be hydrolyzed under specified conditions to prepare an intermediate slurry at pH about 8 that is granulated with recycle and dried to produce final granular products.

Other objects of the present invention are to provide such processes to prepare intermediate melts at pH about 6 and intermediate slurries at pH about 8, which are then granulated and dried under specified conditions favoring hydrolysis of that portion of the $P_2O_5$ present as species more condensed than pyrophosphate.

A still further object of the present invention is to provide such processes for the production of salts and/or solutions from electric-furnace superphosphoric acids for use as fertilizers, or these products may preferably be considered as high-purity intermediates for special use such as inorganic builders in detergent formulations, as reagent chemicals, as medicinal and dental preparations, etc.

Another object of the present invention is to provide a process whereby impure superphosphoric acids such as concentrated wet-process phosphoric acids are ammoniated at atmospheric pressure to produce high-analysis products that may preferably be used as a fertilizer.

Still another object of the present invention is to provide such processes in which the ammoniation of superphosphoric acids is carried out economically at atmospheric pressure with conventional equipment.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

In carrying out the objects of our invention in but several preferred forms thereof, we provide for the ammoniation of superphosphoric acids at atmospheric pressure to proceed in one or more stages and the resulting melts are subsequently treated in various ways to produce solids, solutions or suspensions which contain all the $P_2O_5$ that was originally present in the starting acid. The number of processing steps depends on the kind and composition of the superphosphoric acid that is used, and by the product that is desired, as will be disclosed in the subsequent detailed description.

Our invention, together with further objects and advantages thereof will be better understood from a consideration of the following description taken in connection with the accompanying drawings in which:

FIG. 1 is a graphical illustration showing the distribution of the principal acid species in commercially available electric-furnace superphosphoric acids which were used in the development of our process.

FIG. 2 is a flowsheet generally illustrating the principles of five alternative procedures of our controlled hydrolysis process, which is a division of application Ser. No. 663,171, now Pat. No. 3,484,192, and which results ultimately in the production of the desired high-analysis granular ammonium polyphosphates, solutions, or suspensions by the atmospheric-pressure ammoniation of superphosphoric acid preferably containing more than about 80 percent $P_2O_5$.

In this modification of our process for the preparation of ammonium polyphosphate which is designated as the controlled hydrolysis modification and is one of four divisions of application Ser. No. 663,171, now Pat. No. 3,484,192, the acids are ammoniated and may be hydrolyzed to prepare intermediate melts with pH's ranging from about 5 to 6 that are processed further to produce granular ammonium polyphosphate solids, concentrated aqueous solutions, or suspensions containing pyrophosphate as the major phase and ortho- and tripolyphosphates as minor phases. In carrying out these procedures, the ammoniation and hydrolysis reactions may be done continuously or batchwise, or as a combination of both.

Referring now more specifically to FIG. 2, superphosphoric (>70 percent $P_2O_5$) from a source not shown is fed at a controlled rate through line 94 to hydrolyzer 95. Anhydrous ammonia from a source not shown is fed into hydrolyzer 95 through line 96 and means 97 for controlling the quantity. Water vapor from a source not shown is fed into hydrolyzer 95 through line 98 and means 99 for controlling the quantity. Hydrolyzer 95 is equipped with a motor-driven agitator 100 running at such speed as to obtain rapid and intimate mixing of acid, ammonia, and water. Hydrolyzer 95 also is equipped with any suitable means 101 for heating or cooling to maintain a selected temperature in the range of about 125° C. to about 200° C. The ammonia and water vapor are added to the acid in amounts and rates to form an intermediate melt or a solidified product with pH's in the range of about 5 to 6. Electric-furnace or wet-process acid can be used. Anhydrous ammonia or other sources of ammonia such as ammonium carbonates, ammonium carbamate, urea, etc., may be used in this ammoniation step although anhydrous ammonia is preferred. Compounds other than ammonia and its derivatives may be used also in our process to neutralize the acids. For example, basic reagents such as potassium hydroxide, potassium carbonate, sodium hydroxide, etc., can be used depending upon the desired composition of the final products. The amount of water used may vary from about 100 to 3000 percent of that theoretically required to hydrolyize to pyrophosphate all the species more condensed than $H_4P_2O_7$ in the starting acid. The ammonia and water vapor may be added simultaneously from the beginning, the addition of water may be delayed until the acid is ammoniated to a desired level, the addition of ammonia may be continued after the addition of water is stopped, or the addition of water may be continued after the addition of ammonia is stopped. The intermediate melt at pH about 6 may be formed also in a multistage continuous operation. The intermediate melt at pH about 6 formed in a batch or continuous operation is then processed further; the processing steps depend upon the final product desired. For example, the intermediate melt may preferably be process in alternative methods 1, 2, 3, or 4, as generally illustrated in FIG. 2, or the intermediate melt may be used directly as a solidified melt as alternate No. 5. In alternative method 1, the melt is granulated with recycle to form product F. In alternative method 2, the melt is treated with water and anhydrous ammonia to form an intermediate slurry at pH about 8, which is then granulated with recycle to form product G, or it is granulated with the intermediate melt and recycle to form product H. In alternative method 3, the intermediate melt is dissolved in water or in aqua ammonia to form a solution product I. In alternative method 4, the intermediate melt is treated with water in relatively smaller amounts, and the resulting mixture may be ammoniated further to form suspension product J. Details of these alternative treatments of the intermediate melt follow.

The melt from hydrolyzer 95 is discharged through line 102 to holding tank 103 fitted with means not shown for controlling the temperature sufficiently high to maintain product from hydrolyzer 95 as a fluid melt. The melt from 103 is discharged through line 104 to alternate line 105 and any suitable means 106 for controlling the rate of flow to granulator 107, where it is mixed with recycle fines and with water that is added to granulator 107 by means not shown in an amount ranging from about 1 to about 5 percent by weight of melt plus recycle. The granules from granulator 107 are fed through line 108 into dryer 109 wherein the species more condensed than pyrophosphate that may be present are hydrolyzed further by drying in the temperature range of about 60 to about 105° C. in a humid atmosphere. The dry granules travel via line 110 to a screening means generally illustrated as screens 111 and crusher 112. The crushed oversize material and the fine material are returned to granulator 107 via lines 113 and 114, respectively. The granulator product (product F), discharged through line 115 to storage, will contain about 15 to about 17 percent N and about 58 to about 64 percent $P_2O_5$ and will comprise a mixture of ammonium phosphates with pyrophosphate the predominant species ranging from about 40 to about 90 percent.

In alternative method 2, the intermediate melt is discharged from holding tank 103 through line 104 to alternate line 116 and any suitable means 117 for controlling the rate of flow to precipitation vessel 118. Water from a source not shown is fed into precipitator 118 through line 119 and any suitable means 120 for controlling the rate of flow. Anhydrous ammonia from a source not shown is fed into precipitator 118 through line 121 and any suitable means 122 for controlling the rate of flow. Precipitator 118 is equipped with a pH meter not shown and a motor-driven agitator 123 running at such speed as to obtain rapid and intimate mixing of the melt, water, and ammonia that are added simultaneously at such rates as to maintain a slurry with a selected pH in the range of about 7.4 to about 8.9 and with ratios of N to $P_2O_5$ higher than that in the intermediate melt. The slurry from precipitator 118 is discharged through line 124 to granulator 107 where it is mixed with recycle fines. The granules normally containing about 1 to 8 percent free water from granulator 107 are fed through line 108 into dryer 109. The dry granules travel via line 110 to a screening means generally illustrated as screen 111 and crusher 112. The crushed oversize material and the fine material are returned to granulator 107 via lines 113 and 114, respectively. The granular product (product G), discharged through line 115 to storage, will contain about 18 to about 21 percent N and about 56 to about 59 percent $P_2O_5$, and will comprise a mixture of ammonium phosphates with pyrophosphate the predominant form.

The slurry from precipitator 118 may be granulated also with intermediate melt and recycle to form product H, which will contain about 20 percent N and about 59 percent $P_2O_5$ and will comprise a mixture of ammonium phosphates with pyrophosphate the predominant form.

In alternative method 3, the intermediate melt is discharged from holding tank 103 through lines 104 and 125 and any suitable means 126 for controlling the rate of flow to vessel 127 where it is dissolved with water added alone from a source not shown through line 128 and any suitable means 129 for controlling the rate of flow, or where it is dissolved in a combination of water, added as described, and anhydrous ammonia added from a source not shown through line 130 and any suitable means 131 for controlling the rate of flow. Vessel 127 is equipped with a pH meter not shown and a motor-driven agitator 132 running at such speed as to obtain rapid and intimate mixing of the melt and water, or melt, water, and ammonia added simultaneously at such rates as to maintain a solution product I which is stable at low temperatures as, for example, at 0° C. and which will contain about 10 to about 12 percent N and about 32 to about 42 percent $P_2O_5$ with a pyrophosphate content significantly higher than that in the starting acid. Product I is discharged to storage through line 133.

In alternative method 4, the intermediate melt from holding tank 103 is discharged through lines 104 and 134 and any suitable means 135 for controlling the rate of flow to mixing tank 136 where it is mixed with water from a source not shown added through line 137 and any suitable means 138 for controlling the rate of flow and then treated with anhydrous ammonia added from a source not shown through line 139 and any suitable means 140 for controlling the rate of flow. Mixing tank 136 is equipped with a pH meter not shown and a motor-driven agitator 141 running at such speed as to obtain rapid and intimate mixing of melt, water, and ammonia added simultaneously at such rates as to maintain suspension product J at a selected pH, gross composition and viscosity. Product J is discharged from 136 through line 142 to storage.

In alternate No. 5, the intermediate melt from holding tank 103 is transferred via line 143 to storage for cooling to about 25° C. and for forming a solidified product containing about 14 to about 18 percent N and about 56 to about 66 percent $P_2O_5$ and will comprise a mixture of ammonium phosphates with pyrophosphate the predominant form.

In order that those skilled in the art may better understand how the present invention can be practiced, the following examples of specification applications are given by way of illustration but not by way of limitation. Bench-scale tests of the several methods described above were made batchwise or continuously with electric-furnace superphosphoric acids with $P_2O_5$ contents ranging from about 80 to about 83 percent. Tests also were made with a wet-process acid that had been concentrated thermally to $P_2O_5$ contents of about 74 percent from "green" commercial acid (about 52 percent $P_2O_5$) produced from calcined phosphate rock.

EXAMPLE I

A series of tests was made of this modification of our process, as generally illustrated in FIG. 2, to determine the effects of temperature and rates of water and ammonia additions on the hydrolysis of superphosphoric acids in the formation of melts with pyrophosphate contents significantly higher than in the starting acid. The tests were made with 115 percent superphosphoric acid (83.1 percent $P_2O_5$, distributed as ortho- 7, pyro- 18, and longer-chain phosphates 75 percent).

Batches of the acid (100 grams), preheated to the desired reaction temperature in an open container, were treated with gaseous ammonia and water vapor. The vapors were introduced into the acid through sparger tubes; vigorous agitation was provided with a mechanical stirrer. The reaction temperatures in the range 125° to 200° C. were controlled within ±3° C. In some tests ammonia and water were added simultaneously from the beginning; in other tests the addition of water vapor was delayed until the acid had been ammoniated to about pH 1, and in other tests the addition of ammonia was continued after the addition of water vapor was stopped. Ammoniation was usually continued until the pH of the hot melt was about 5.5. The amount of water used was based on the theoretical requirement to hydrolyze to pyrophosphate all the species more condensed than $H_4P_2O_7$. For this particular acid (83.1 percent $P_2O_5$) the theoretical quantity was calculated to be 4.5 grams $H_2O$ per 100 grams of acid. However, excess water was used in most tests; preliminary experiments showed that the theoretical amount was insufficient to hydrolyze all the long-chain species, because of mechanical losses and the formation of an undetermined amount of hydrates. Most of the tests were carried out at 125° or 150° C. In some tests the initial ammoniation was done at 200° C., after which the reaction mixture was cooled to and controlled at 125° or 150° C. after start of the water vapor. The rates of addition of ammonia and of water vapor ranged from 0.3 to 1.1 grams $NH_3$/min. and from 0.16 to 0.32 gram $H_2O$/min.

Results of several typical tests are summarized in Table I below.

with grades of about 16–63–0 had good physical properties.

EXAMPLE II

Other tests of the alternate procedure of this modification illustrated in FIG. 2 were made with (1) electric-furnace acid containing 79.6 percent $P_2O_5$, distributed as 25 percent ortho-, 39 percent pyro-, 20 percent tripoly-, and 16 percent longer-chain phosphates, and (2) concentrated wet-process acid containing 73.5 percent $P_2O_5$, distributed as 49 percent ortho-, 42 percent pyro-, 7 percent tripoly-, and 2 percent longer-chain phosphates. In these TABLE I.—AMMONIATION AND HYDROLYSIS OF SUPERPHOSPHORIC ACID (83.1 PERCENT $P_2O_5$)

| No. | Temp., °C. | Ammoniation | | | Water added | | Product | | | | | | |
|---|---|---|---|---|---|---|---|---|---|---|---|---|---|
| | | Time, min. | pH | Rate, g. $NH_3$/min. | Percent[1] | Rate, g./min. | Composition, percent | | g. $NH_3$/20 g. $P_2O_5$ | Distribution, percent, of $P_2O_5$ | | | |
| | | | | | | | N | $P_2O_5$ | | Ortho | Pyro | Tri | Other |
| Acid[1] | | | | | | | | 83.1 | | 6.7 | 18.0 | 17.0 | [2]58.3 |
| 19A | 125 | 16 | 1.0 | 0.65 | a 200 | 0.16 | 7.4 | 74.4 | 2.4 | 10 | 23 | 19 | 48 |
| | | 31 | 2.1 | | | | 11.9 | 69.2 | 4.2 | 12 | 26 | 22 | 40 |
| | | [3]58 | 5.5 | | | | 15.8 | 64.1 | 6.0 | 15 | 43 | 28 | 14 |
| | | 70 | 5.8 | | | | 16.3 | 62.8 | 6.3 | 6 | 74 | 12 | 8 |
| 22 | 125 | 10 | 1.0 | 1.1 | 200 | 0.27 | 7.3 | 74.7 | 2.4 | 10 | 24 | 19 | 47 |
| | | 20 | 2.5 | | | | 12.6 | 68.1 | 4.5 | 13 | 31 | 24 | 32 |
| | | 30 | 4.8 | | | | 14.8 | 65.9 | 5.5 | 14 | 39 | 27 | 20 |
| | | [3]36 | 5.2 | | | | 15.6 | 64.6 | 5.9 | 14 | 42 | 27 | 17 |
| | | 49 | 5.7 | | | | | | | 14 | 45 | 28 | 13 |
| | | 55 | 5.7 | | | | 16.3 | 62.9 | 6.3 | 7 | 81 | 6 | 6 |
| 23 | 150 | 15 | 0.7 | 0.48 | b 300 | 0.32 | | | | 5 | 15 | 15 | 65 |
| | | [4]26 | 1.0 | | | | 8.5 | 74.5 | 2.8 | 6 | 14 | 14 | 66 |
| | | 56 | 4.8 | | | | 14.9 | 66.0 | 5.5 | 11 | 34 | 28 | 27 |
| | | [3]73 | 5.5 | | | | 16.5 | 63.9 | 6.3 | 12 | 42 | 30 | 16 |
| | | 82 | 5.6 | | | | 16.6 | 62.7 | 6.4 | 4 | 75 | 10 | 11 |
| 30 | [5]125 | [4]10 | 0.4 | 0.53 | 300 | 0.30 | | | | 7 | 15 | 15 | 63 |
| | | 25 | 1.3 | | | | 9.3 | 71.2 | 3.2 | 14 | 28 | 22 | 36 |
| | | 50 | 5.3 | | | | 15.7 | 62.5 | 6.1 | 27 | 49 | 19 | 5 |
| | | [3]56 | 5.6 | | | | 16.4 | 62.0 | 6.4 | 27 | 69 | 3 | 1 |

[1] 100 percent is the amount, 4.5 grams $H_2O$/100 grams acid, required to hydrolyze all higher species to pyrophosphates; about 100 grams of acid used in each test.
[2] Tetra 15.1, penta 12.2, hexa 9.9, hepta 8.2, octa and higher 12.9 percent.
[3] Water stopped.
[4] Water started.
[5] Temperature rose from 150° to 200° C. during initial 10 minutes of ammoniation; mixture cooled to 125° C. before addition of water.
a Water added at start of ammoniation.
b Water added after ammoniation started.

The results show that superphosphoric acid containing about 83 percent $P_2O_5$ can be ammoniated at atmospheric pressure and hydrolyzed under specified conditions to produce ammonium polyphosphate in which the distribution of phosphate species can be controlled within wide limits. For example, the solidified melts contained 69 to 81 percent pyrophosphate, an increase in this desirable component of about 400 percent over that in the starting acid; the orthophosphate content ranged from about 6 percent (same as in the starting acid) to 27 percent. The products also contained 4 to 21 percent of phosphates more condensed than pyrophosphate, which corresponds to a 4- to 19-fold decrease of these species over the total amount (75 percent) in the starting acid. These products tests the acids were heated to and maintained at 200° C. while ammoniating during the first 60-minute period to pH about 5, the hot mixture was cooled rapidly to 125° C. and maintained at this temperature while adding water vapor and ammonia simultaneously during the final 15- to 25-minute periods.

Results of two typical tests show that these acids also can be ammoniated at atmospheric pressure and hydrolyzed under specified conditions to produce ammonium polyphosphate with pyrophosphate contents significantly higher than that in the starting acids. The products containing about 6 grams $NH_3$ per 20 grams $P_2O_5$ had good physical properties. The results are summarized in Table II below.

TABLE II.—AMMONIATION AND HYDROLYSIS OF SUPERPHOSPHORIC ACIDS
[Acid I—Electric furnace, 79.6% $P_2O_5$; Acid II—Concentrated wet-process, 73.5% $P_2O_5$]

| No.[1] | Temp., °C. | Ammoniation | | | Water added | | Product | | | | | | |
|---|---|---|---|---|---|---|---|---|---|---|---|---|---|
| | | Time, min. | pH | Rate, g. $NH_3$/min. | g./100 g. acid | Rate, g./min. | Composition, percent | | g. $NH_3$/20 g. $P_2O_5$ | Distribution, percent, of $P_2O_5$ | | | |
| | | | | | | | N | $P_2O_5$ | | Ortho | Pyro | Tri | Other |
| Acid I | | | | | | | | 79.6 | | 25.1 | 39.1 | 19.5 | [1]16.3 |
| 35 | [2]125 | 10 | 0.55 | 0.4 | 4.5 | 0.30 | | | | 23 | 36 | 21 | 20 |
| | | 30 | 2.7 | | | | | | | 21 | 37 | 22 | 20 |
| | | 60 | 5.1 | | | | | | | 18 | 42 | 25 | 15 |
| | | 75 | 5.3 | | | | 15.9 | 62.3 | 6.2 | 17 | 74 | 7 | 2 |
| Acid II | | | | | | | | 73.5 | | 49.5 | 41.7 | 6.9 | [5]1.9 |
| 33 | [2]125 | 10 | 0.85 | 0.4 | 7 | 0.26 | | | | 47 | 37 | 12 | 4 |
| | | 30 | 2.2 | | | | | | | 40 | 44 | 13 | 3 |
| | | [3]60 | 5.5 | | | | | | | 33 | 52 | 12 | 3 |
| | | [4]87 | 6.1 | | | | 16.4 | 58.2 | 6.8 | 39 | 58 | 2 | 1 |

[1] Tetra 9.4, penta 4.0, hexa 2.7, hepta and higher 0.2%.
[2] Acids heated to and maintained at 200° C. for initial 60 minutes of ammoniation; mixtures cooled to 125° C. before addition of water.
[3] Water started.
[4] Water stopped.
[5] Tetra 1.7, penta and higher 0.2%.

EXAMPLE III

In a typical test of the granulation step shown as alternate route No. 1 in FIG. 2, one part of melt (16.5 percent N, 64.1 percent $P_2O_5$; ortho- 14, pyro- 45, tripoly- 27, other long-chain phosphates 14 percent) and 4 parts of recycle (−12 mesh; 16.3 percent N, 62.9 percent $P_2O_5$; ortho- 7, pyro- 81, tripoly- 6, other long-chain phosphates 6 percent) were mixed mechanically with an amount of water corresponding to 3 percent by weight of mixture. The moist granules were heated 0.5 hour at 105° C. The hard granular product (product F) contained 16.4 percent N and 62.9 percent $P_2O_5$ distributed as ortho- 9, pyro- 84, tripoly- and other long-chain species 7 percent. The product had good physical properties.

In other tests, portions of a melt containing 11.1 percent N and 67.0 percent $P_2O_5$ were treated with various amounts of water and then ammoniated to form dry granular products with ratios of N to $P_2O_5$ higher than the ratios normally in granular products made from melt and recycle.

In the tests, the melt was cooled with stirring to about 75° C. in an ammonia atmosphere, and water was added to each of three portions of the cooled melt in amounts equivalent to 6.5, 13, and 27 grams per 100 grams of melt. The moist mixtures were stirred and ammoniated until dry.

The results show that the degree of ammoniation in the product increased as the amount of water added was increased. The degree of ammoniation was maximal (9 lb. $NH_3$/20 lb. $P_2O_5$) when the water added was in an amount equivalent to 27 grams per 100 grams of melt. The distributions of phosphate species in the products indicate that about 9 pounds $NH_3$ per unit of $P_2O_5$ is the maximum to be expected. These dry granular products had good physical properties. These results are given in Table III below.

The moist granules were then dried at 65° C. for 30 minutes to produce product H.

The compositions of the intermediate melt and slurry, and the granular products are given in Table IV below. Both granular products had good physical properties.

TABLE IV.—GRANULAR MATERIAL PRODUCED AS IN EXAMPLE XVIII

| Product | Composition percent | | Distribution, percent, of $P_2O_5$ | | | |
|---|---|---|---|---|---|---|
| | N | $P_2O_5$ | Ortho | Pyro | Tripoly | Other |
| Melt, pH 5.5 | 16.5 | 64.1 | 14 | 45 | 27 | 14 |
| Slurry, pH 8.3 | 15.2 | 41.0 | 13 | 57 | 20 | 10 |
| Granular product G | 20.6 | 57.1 | 13 | 58 | 21 | 8 |
| Granular product H | 19.6 | 58.8 | 12 | 62 | 18 | 8 |

EXAMPLE V

A test of alternate No. 3 of this modification, illustrated in FIG. 2, was made ot produce from an intermediate melt a concentrated solution which would be stable at 0° C.

The melt at pH 5.4 was prepared from superphosphoric acid (83.1 percent $P_2O_5$) as described in test 22, Example I, except that in this test the temperature was maintained at 150° C. The melt, cooled to 25° C., was dissolved in water and stored at 0° C. for 16 days. The stable solution, product I, had a pH of 5 and contained 10.5 percent N and 41.6 percent $P_2O_5$, distributed as ortho- 12, pyro- 69, tripoly- 13, and longer-chain phosphates 6 percent.

EXAMPLE VI

A test of alternate No. 4 of this modification, illustrated in FIG. 2, was made to produce a concentrated suspension from an intermediate melt.

TABLE III.—AMMONIATION AND GRANULATION OF AMMONIUM POLYPHOSPHATE MELT

| Test | Water added, g./100 g. melt | Product | | | | | | |
|---|---|---|---|---|---|---|---|---|
| | | Composition, percent | | Lb. $NH_3$/20 lb. $P_2O_5$ | Distribution, percent of $P_2O_5$ | | | |
| | | N | $P_2O_5$ | | Ortho | Pyro | Tripoly | Other |
| (1) | | 11.1 | 67.0 | | 38 | 40 | 15 | 7 |
| 1 | 6.5 | 15.1 | 61.1 | 6.0 | 29 | 43 | 20 | 8 |
| 2 | 13 | 16.5 | 58.3 | 6.9 | 35 | 42 | 17 | 7 |
| 3 | 27 | 20.7 | 56.0 | 9.0 | 30 | 40 | 19 | 11 |

[1] Untreated melt.

EXAMPLE IV

A test of alternate No. 2 of this modification, illustrated in FIG. 2, was made to produce from an intermediate melt a slurry for granulation. The melt at pH 5.5 was prepared from superphosphoric acid (83.1 percent $P_2O_5$) as described in test 22, Example I, except in this test the temperature was maintained at 150° C. The melt, after cooling to about 80° C., was treated with water and ammonia to produce a slurry containing 15.2 percent N and 41.0 percent $P_2O_5$. During ammoniation to pH 8.3, the temperature decreased to about 50° C.

A portion of the slurry was separated into liquid and moist solid phases by filtration. The moist solids were dried at 66° C., then crushed to minus 6 mesh and added to a portion of the filtrate in weight ratios of 2 parts solid to 1 part filtrate. The mixture was stirred manually until homogeneous and then dried at 66° C. In the second granulation step, the dried material (3 parts) was mixed with the remaining filtrate (1 part) and then dried as before to produce product G. Another portion of the slurry was granulated with product G and the initial melt in the proportions of 1 part slurry, 2 parts product G, and 1 part of the reserved melt reheated to 140° C.

The melt at pH 5.5 was prepared from superphosphoric acid (83.1 percent $P_2O_5$) as described in test 23, Example I. The melt, cooled to 25° C., was dissolved in 10 minutes at 80° C. in water to form a solution containing 45 percent $P_2O_5$. When cooled to 25° C., a suspension of fine crystals was formed with diammonium pyrophosphate as the major phase and triammonium pyro- and diammonium orthophosphates as minor phases. The suspension, product J–1, had a pH of 5.1; it contained 11.9 percent N and 45.0 percent $P_2O_5$, distributed as ortho- 4, pyro- 75, tripoly- 10, and longer-chain phosphates 11 percent; and it had a viscosity of 270 centipoises at 25° C.

This suspension (product J–1) was diluted with water to form another suspension, product J–2, that contained 10.6 percent N and 40.0 percent $P_2O_5$ and had a viscosity of 70 centipoises at 25° C.

Product J–2 was ammoniated to pH 6.1 to form another suspension, product J–3, which contained about 11 percent N and 39 percent $P_2O_5$, distributed as ortho- 7, pyro- 84, and tripoly- 5, and longer-chain phosphates 4 percent, and had a viscosity of 240 centipoises at 25° C.

EXAMPLE VII

In other tests of modification II, an intermediate melt at pH 5.5 was prepared from superphosphoric acid (83.1 percent $P_2O_5$) as described in test 22 of Example I, except that in this preparation the temperature was maintained at 150° C. Portions of this melt then were mixed with ammonium bicarbonate and/or water in various ways to form (1) a granular product with a weight ratio of N to $P_2O_5$ higher than that in granular products prepared from melt plus recycle, (2) a concentrated solution stable at 0° C., or (3) a concentrated suspension.

In one test, 10 parts of the hot melt at pH 5.5 was reacted with 4 parts of ammonium bicarbonate, and then heated at 105° C. for 15 minutes. The product contained 18.7 percent N and 59.8 percent $P_2O_5$, distributed as ortho- 16, pyro- 62, tripoly- 18, and longer-chain phosphates 4 percent. This product with good physical properties has a degree of ammoniation 20 percent higher than that of product F, Example III, that was made from melt plus recycle.

In another test, 10 parts of the melt and 2.3 parts of water were stirred together at 70° C. for 2 hours. Ammonium bicarbonate, 2 parts, was added gradually and the mixture was stirred for 1 hour at about 50° C. The resultant thick slurry (about 45 percent $P_2O_5$) was then diluted with water (10 parts slurry to 1.25 parts water) and heated for 15 minutes at 70° C. to form a less viscous slurry with pH 6.2 that contained 13.3 percent N and 40.9 percent $P_2O_5$, distributed as ortho- 16, pyro- 74, and longer-chain phosphates 10 percent; it had a viscosity of about 1000 centipoises at 25° C.

This slurry (13–41–0) was stored at 0° C. for 6 days and then centrifuged at about 0° C. to separate the solution phase stable at 0° C. The solution contained 12.0 percent N and 38.8 percent $P_2O_5$, distributed as ortho- 19, pyro- 67, tripoly- 10, and longer-chain phosphate 4 percent.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by Letters Patent of the United States is:

1. An improved fully integrated process for the production of ammonium polyphosphates (at atmospheric pressure) which comprises the steps of:
   (1) simultaneously adding streams of anhydrous ammonia and water vapor to a batch of superphosphoric acid in a first reaction zone, said superphosphoric acid containing more than about 70 percent $P_2O_5$ by weight; therein rapidly and intimately mixing said reactants; controlling the proportion of ammonia added to said first reaction zone such that the pH of the reaction mixture is raised to within the range of about 5 to about 6 within a period of about 10 to 150 minutes; controlling the proportion of water vapor such that the said water vapor added is within the range of 100 to about 3000 percent of that theoretically required to hydrolyze to pyrophosphate all the species in the acid more condensed than the pyro form; maintaining the reaction mixture at a temperature in the range of about 125° to about 200° C.; producing in said first reaction zone an intermediate melt containing about 15 to about 17 percent N and about 58 to about 64 percent $P_2O_5$, and in which the pyrophosphate content ranges from about 40 to about 90 percent of the total phosphate;
   (2) withdrawing a stream of said intermediate melt from said first reaction zone and subjecting said withdrawn intermediate melt to granulation with recycle fines of finished product and water in such amounts that said added water ranges from about 1 to about 5 percent by weight of the total weight of intermediate melt and recycle fines, said recycle fines from step (4) infra;
   (3) withdrawing a stream of moist granulation product from granulation apparatus and introducing said withdrawn product into a dryer operating at a temperature range of about 50° to about 110° C.;
   (4) recovering from said dryer a solid product which comprises a mixture of substantially ammonium ortho-, pyro-, and tripolyphosphates, with ammonium pyrophosphate the predominant form, and which contains about 15 to about 17 percent N and about 58 to about 64 percent $P_2O_5$.

2. The process of claim 1 wherein the said intermediate melt produced in said first reaction zone is:
   (1) withdrawn from said first reaction zone and introduced into a second reaction zone, together with streams of anhydrous ammonia and water added to maintain the water content of the mixture in the range of about 20 to about 47 percent; maintaining the temperature in said second reaction zone in the range of about 50° to about 110° C.; controlling the relative proportions of anhydrous ammonia and intermediate melt added to said second reaction zone to raise the pH therein to within the range of about 7.4 to about 8.9, said pH adjustment sufficient to form in said second reaction zone a slurry containing more than about 45 weight percent total $(N+P_2O_5)$;
   (2) retaining said slurry in said second reaction zone for an average retention time in excess of about 5 minutes;
   (3) withdrawing a stream of said slurry from said second reaction zone and introducing said stream of slurry directly to granulation and drying (temperature ranging from about 50° to about 110° C.) operations and recovering therefrom a solid product containing by weight from about 16 percent to about 21 percent nitrogen and from about 55 percent to about 63 percent $P_2O_5$, and consisting of substantially ammonium orthophosphates, ammonium pyrophosphates, and ammonium tripolyphosphates.

3. The process of claim 1 wherein the said intermediate melt produced in said first reaction zone is withdrawn and introduced into a second reaction zone, together with streams of anhydrous ammonia and water; therein rapidly and intimately mixing said reactants and maintaining the temperature within the range of about 25° to about 110° C.; controlling the relative proportions of intermediate melt and ammonia added to said second reaction zone to maintain the pH therein within the range of about 5 to about 7; controlling the proportions of water added to said second reaction zone so as to withdraw a solution from said second reaction zone containing more than about 42 weight percent total $(N+P_2O_5)$ and comprising about 10 to about 12 percent N and about 32 to about 42 percent $P_2O_5$; said solution having a pyrophosphate content ranging from about 40 to about 90 percent of the total phosphate.

4. The process of claim 1 wherein the said intermediate melt produced in said first reaction zone is withdrawn and introduced into a second reaction zone, together with streams of anhydrous ammonia and water; therein rapidly and intimately mixing said reactants and maintaining the temperature within the range of about 25° to about 110° C.; controlling the relative proportions of intermediate melt and ammonia added to said second reaction zone to maintain the pH therein within the range of about 5 to about 7; controlling the proportions of water added to said second reaction zone so as to form a suspension of fine crystals comprising ammonium phosphates, with ammonium pyrophosphate being the predominant specie; withdrawing from said second reaction zone a suspension of said ammonium phosphate containing more than about 50 weight percent total $(N+P_2O_5)$ and comprising about 10 to about 14 percent N and about 38 to about 45 percent $P_2O_5$; said suspension having a pyrophosphate content ranging from about 40 to about 90 percent of the total phosphate.

5. The process of claim 1 wherein the said intermediate melt produced in said first reaction zone is withdrawn and cooled thereby forming a solidified product containing about 14 to about 18 percent N and about 56 to about 66 percent $P_2O_5$ and consisting of a mixture of ammonium phosphates with pyrophosphate the predominant specie.

References Cited

UNITED STATES PATENTS

| | | | |
|---|---|---|---|
| 3,243,279 | 3/1966 | Young | 71—43 |
| 3,382,059 | 5/1968 | Getsinger | 71—34 |

OSCAR R. VERTIZ, Primary Examiner

G. A. HELLER, Assistant Examiner

U.S. Cl. X.R.

71—34, 43